(12) United States Patent
Thébault et al.

(10) Patent No.: US 8,351,512 B2
(45) Date of Patent: Jan. 8, 2013

(54) METHOD OF ESTIMATING MOTION BETWEEN TWO VIDEO FRAMES

(75) Inventors: Cédric Thébault, Chantepie (FR); Sébastien Weitbruch, Kappel (DE); Carlos Correa, Villingen-Schwenningen (DE)

(73) Assignee: Thomson Licensing, Issy les Moulineaus (FR)

( * ) Notice: Subject to any disclaimer, the term of this patent is extended or adjusted under 35 U.S.C. 154(b) by 149 days.

(21) Appl. No.: 12/735,781

(22) PCT Filed: Mar. 13, 2008

(86) PCT No.: PCT/EP2008/053016
§ 371 (c)(1), (2), (4) Date: Aug. 17, 2010

(87) PCT Pub. No.: WO2009/103350
PCT Pub. Date: Aug. 27, 2009

(65) Prior Publication Data
US 2010/0321582 A1   Dec. 23, 2010

(30) Foreign Application Priority Data
Feb. 20, 2008   (EP) .................................... 08300104

(51) Int. Cl.
*H04N 7/12* (2006.01)
*H04N 11/02* (2006.01)
*H04N 11/04* (2006.01)

(52) U.S. Cl. ................ 375/240.16; 348/413; 348/413.1; 348/402; 348/416.1; 348/699

(58) Field of Classification Search ................ 375/240.01–240.29; 348/699, 348/402, 413, 413.1, 416, 416.1
See application file for complete search history.

(56) References Cited

U.S. PATENT DOCUMENTS

| | | | |
|---|---|---|---|
| 6,128,047 A * | 10/2000 | Chang et al. | 348/699 |
| 6,285,711 B1 | 9/2001 | Ratakonda et al. | |
| 2004/0109503 A1 * | 6/2004 | Lee | 375/240.16 |

FOREIGN PATENT DOCUMENTS

| | | |
|---|---|---|
| EP | 1755345 | 2/2007 |
| KR | 97011380 | 7/1997 |

OTHER PUBLICATIONS

Search Rept: Oct. 23, 2008.

* cited by examiner

*Primary Examiner* — Sath V Perungavoor
*Assistant Examiner* — Nathnael Aynalem
(74) *Attorney, Agent, or Firm* — Tutunjian & Bitetto, P.C.

(57) ABSTRACT

The invention relates to a method of estimating motion between two video frames. According to the invention, the motion estimation is done by using first one motion estimation in the horizontal direction and then one motion estimation in the vertical direction. Preferably, a plurality of motion estimations in the horizontal direction are used alternately with motion estimations in the vertical direction. It allows reducing the complexity of the estimation.

10 Claims, 13 Drawing Sheets

METHOD OF ESTIMATING MOTION BETWEEN TWO VIDEO FRAMES

This application claims the benefit, under 35 U.S.C. §365 of International Application PCT/EP2008/053016, filed Mar. 13, 2008, which was published in accordance with PCT Article 21(2) on Aug. 27, 2009 in English and which claims the benefit of European patent application No. 08300104.0, filed Feb. 20, 2008.

The invention relates to a method of estimating motion between two video frames. It can be implemented in any kind of digital display devices to improve the motion rendition.

BACKGROUND OF THE INVENTION

Motion compensation is a hot topic today since it is used in various display devices like Liquid Crystal Displays or Plasma Display Panels to improve the motion rendition. It is typically used to convert the 50/60 Hz source to 100/120 Hz. Motion compensation requires motion estimation.

The known motion estimation methods are quite expensive since they are based on 2-dimensions search. For example, to estimate motions up to +/−n pixels per frame in horizontal axis and +/−p pixels per frame in vertical axis, the standard methods have a n×p complexity.

SUMMARY OF THE INVENTION

The invention proposes a motion estimation method having a reduced complexity.

According to the invention, the motion estimation is done by using successively 1-dimension searches, which means at least one motion estimation in a first spatial direction and one motion estimation in a second spatial direction. If one motion estimation in a first spatial direction and one motion estimation in a second spatial direction are required, the complexity of the method is reduced to n+p to estimate motions up to +/−n pixels per frame in horizontal and +/−p pixels per frame in vertical.

The invention concerns a method of estimating motion at a predefined time position in a video sequence comprising at least first and second video frames, comprising the steps of:
a) estimating, for at least one pixel of a frame located at the predefined time position, a first motion vector component in a first spatial direction based on the first video frame and the second video frame,
b) compensating at least a part of the second video frame based on at least a part of the estimated first motion vector component, and
c) estimating, for the at least one pixel of a frame located at the predefined time position, a second motion vector component in a second spatial direction based on the first video frame and the compensated second video frame.

In another embodiment, the method further comprises the steps of:
d) checking if a first stop criterion is reached at the end of the step c), and
e) as long as a first stop criterion is not reached, compensating the second video frame based on at least a part of the estimated second motion vector component, estimating for the at least one pixel of a frame located at the predefined time position a new first motion vector component in the first spatial direction based on the first video frame and the new compensated second video frame and reiterating the steps b) to d).

The first stop criterion is for example reached when the number of iterations is equal to N, N being an integer greater than one. In a variant, the first stop criterion is not reached as long as the differences between the first and second motion vector components resulting from a first iteration in step e) and the first and second motion vector components resulting from a next iteration in step e) are greater than a threshold value. When these differences are close to zero, the first stop criterion is reached.

In another embodiment, the steps b) to d) are reiterated in step e) only if a second stop criterion is not reached. For example, the second stop criterion is not reached as long as the difference between a new first motion vector component resulting from a first iteration in step e) and a new first motion vector components resulting from a next iteration in step e) is greater than a threshold value. In that case, the second stop criterion is reached when the difference is close to zero.

BRIEF DESCRIPTION OF THE DRAWINGS

Exemplary embodiments of the invention are illustrated in the drawings and are explained in more detail in the following description. In the drawings.

DESCRIPTION OF PREFERRED EMBODIMENTS

Figure 1:
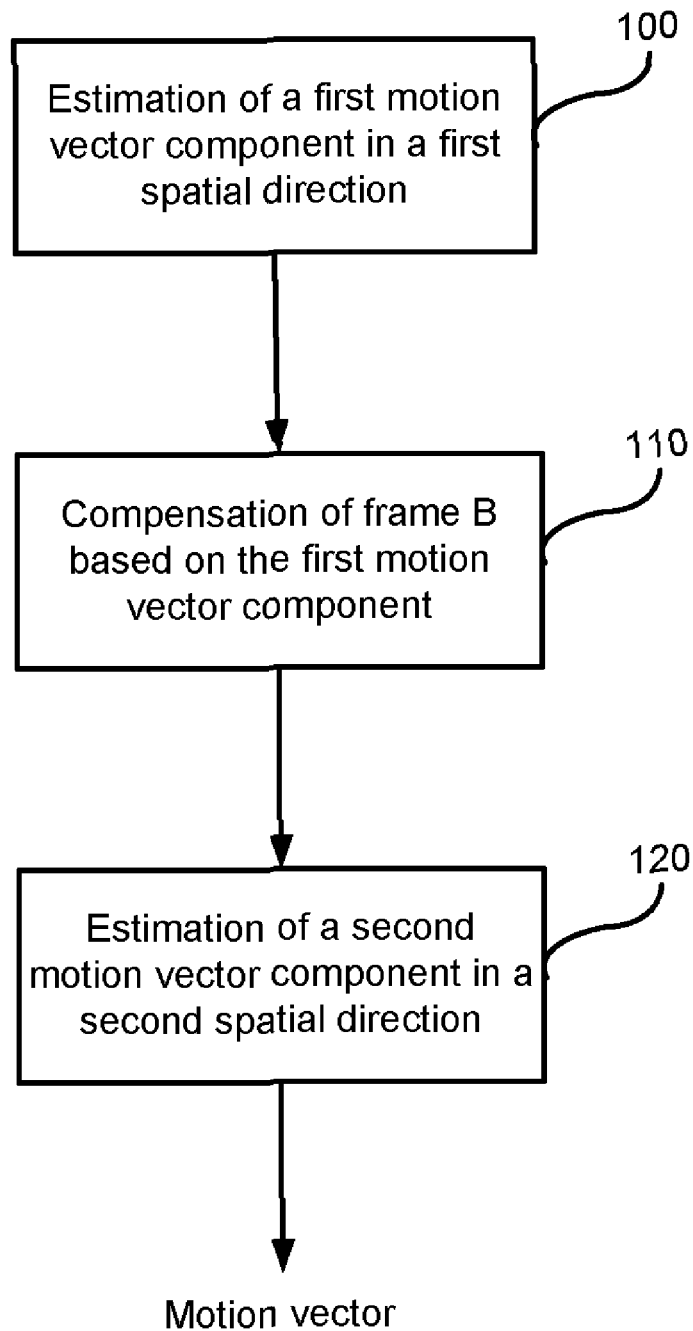
FIG. 1 shows the steps of a first embodiment of the inventive method.

In the following detailed description, only certain exemplary embodiments of the present invention are shown and described, by way of illustration. As those skilled in the art would recognize, the described exemplary embodiments may be modified in various ways, all without departing from the spirit or scope of the present invention; Accordingly, the drawings and description are to be regarded as illustrative in nature, rather than restrictive. Like reference numerals designate like elements. The motion is estimated at a predefined time position in a video sequence comprising the frames A and B. This time position can be located at a time between the time positions of frames A and B or at another time position. The motion can also be estimated at the time position of frame A or frame B.

FIG. 1 shows the steps of a first method of estimating the motion at a predefined time position in a video sequence comprising the frames A and B in accordance with the invention. This method comprises:
 a step 100 of estimating, for at least one pixel of the frame located at the predefined time position, a first motion vector component in a first spatial direction based on the video frames A and B;
 a step 110 of compensating at least a part of the video frame B based on at least a part of the estimated first motion vector component, a step 120 of estimating, for said at least one pixel of the frame located at the predefined time position, a second motion vector component in a second spatial direction based on the video frame A and the compensated video frame B.

The first spatial direction is for example the horizontal direction and the second spatial direction is the vertical direction. In a variant, the first spatial direction is the vertical direction and the second spatial direction is the horizontal direction. The video frame B is consecutive to the video frame A or vice-versa. At step 110, instead of compensating the video frame B in accordance with the motion vector component estimated at step 100 or a part of it, it is also possible to compensate the video frame A in accordance with a part of the motion vector component estimated at step 100 and to compensate the video frame B in accordance with another part of the motion vector component estimated at step 100. In this second case, the estimation step 120 is carried out between the two compensated video frames.

The motion vector is estimated for a pixel in a frame at a given time position. If this time position corresponds to one of the two frames A and B (for example) only the other frame has to be compensated (B in this case). In the other cases the two frames have to be compensated in accordance with a part of the motion vector.

This method is illustrated by an example given at FIGS. 2A to 2G. In this example, the first spatial direction is the horizontal direction and the second spatial direction is the vertical direction. The motion vector is estimated for a pixel P of the frame A (the predefined time position corresponds to the time position of the video frame A). The video frame A is a picture showing a grey square 20 on a white background. The horizontal and vertical coordinates of the left-upper corner of the square are x1 and y1. In the video frame B, the grey square has moved and the horizontal and vertical coordinates of the left-upper corner of the square in this frame are x2 and y2.

Figure 2A:
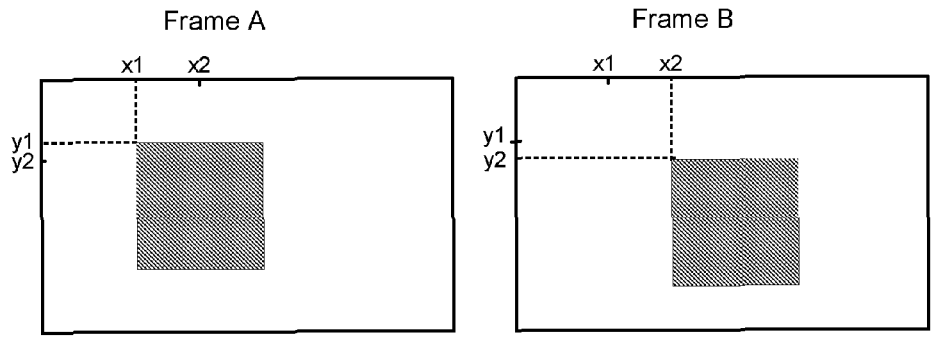
FIG. 2A to FIG. 2G shows an example of motion estimation in accordance with the method of FIG. 1.
Figure 2B:
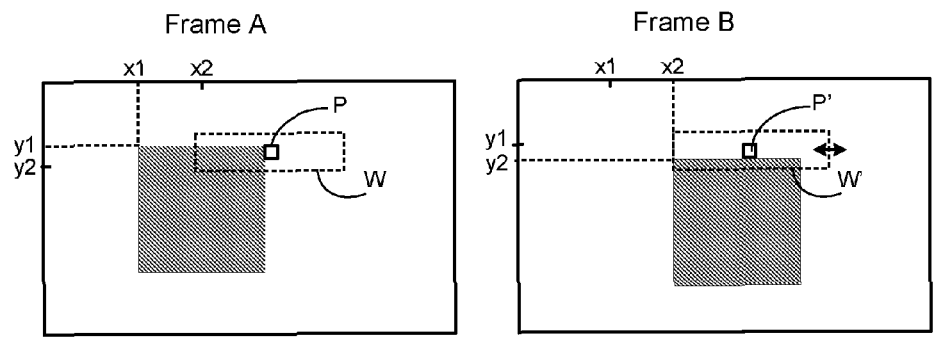
Figure 2C:
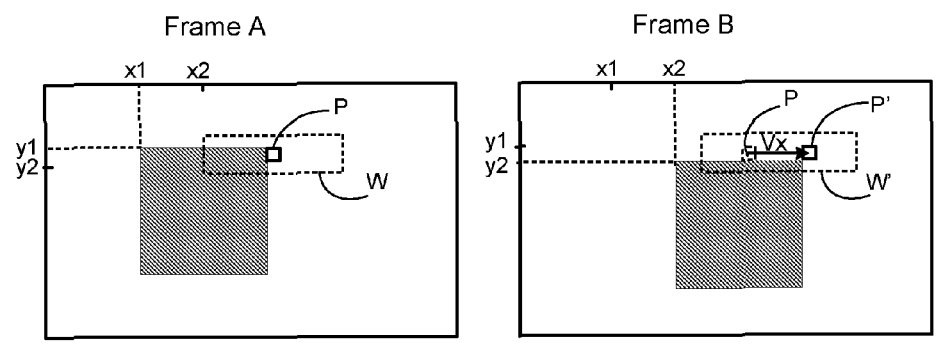
Figure 2D:
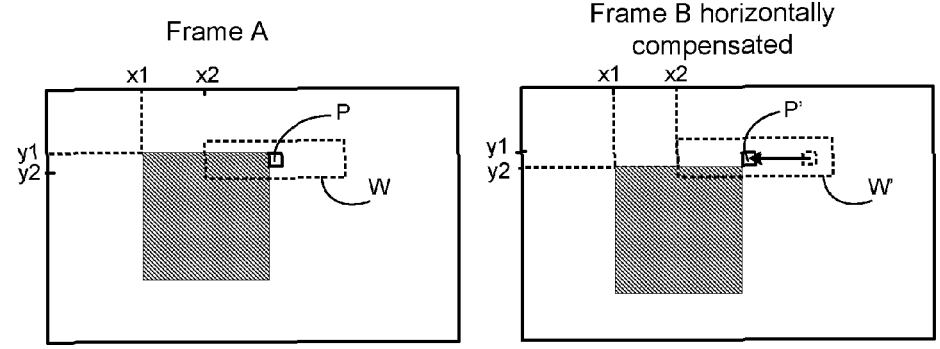
Figure 2E:
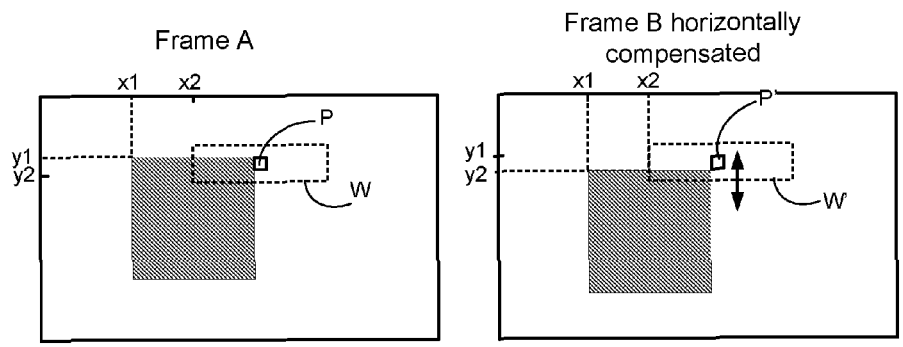
Figure 2F:
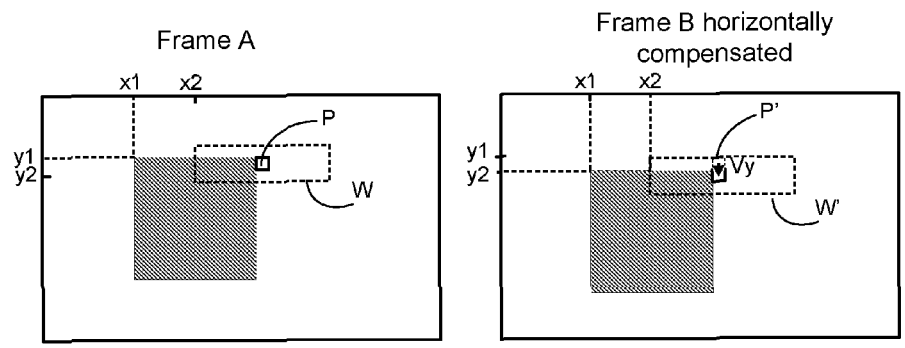
Figure 2G:
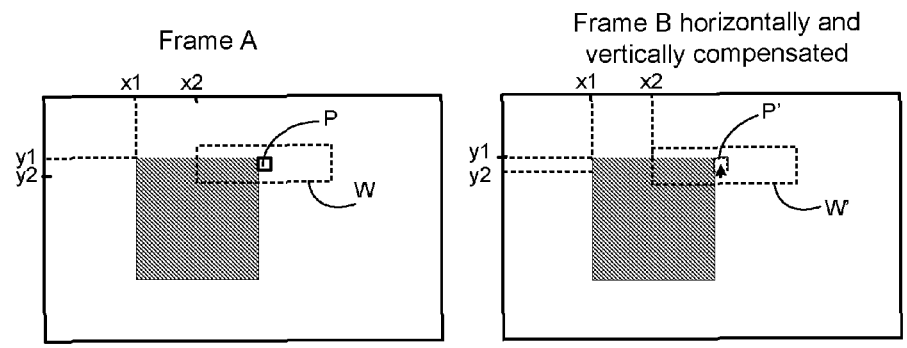

The FIG. 2A shows the frames A and B. In FIG. 2B, a window W centered on a pixel P is defined in frame A. A window W' identical to the window W is defined in frame B. This window W' is centered on a pixel P' having the same spatial coordinates than the pixel P. The estimating step 100 consists in shifting horizontally the window W' in order to determine the best match between the content of the window W and the content of the window W'. In case of a time position of the motion estimation not located on frame A or B, the windows W and W' would be shifted together with their corresponding center pixel P and P' along the motion vector positioned on the pixel in the frame at the predetermined time position. FIG. 2C shows the best match and the estimated horizontal component Vx of the motion vector. The step 110 is illustrated by the FIG. 2D. The frame B is compensated in accordance with the motion vector component Vx. The estimating step 120 consists in shifting vertically the window W' in order to determine the best match between the content of the window W and the content of the window W' as illustrated by the FIG. 2E. FIG. 2F shows the best match and the estimated vertical component Vy of the motion vector. The vector (Vx,Vy) is the motion vector estimated for the pixel P. The FIG. 2G shows the frame B compensated horizontally and vertically in accordance with the motion vectors Vx and Vy estimated previously. This FIG. 2G does not correspond to a step of the method but shows that the estimation is correct.

In this example, the right motion vector components are determined with only one estimation step in the first spatial direction and one estimation step in the second spatial direction. In some cases, a greater number of estimation steps are mandatory.

Figure 3:
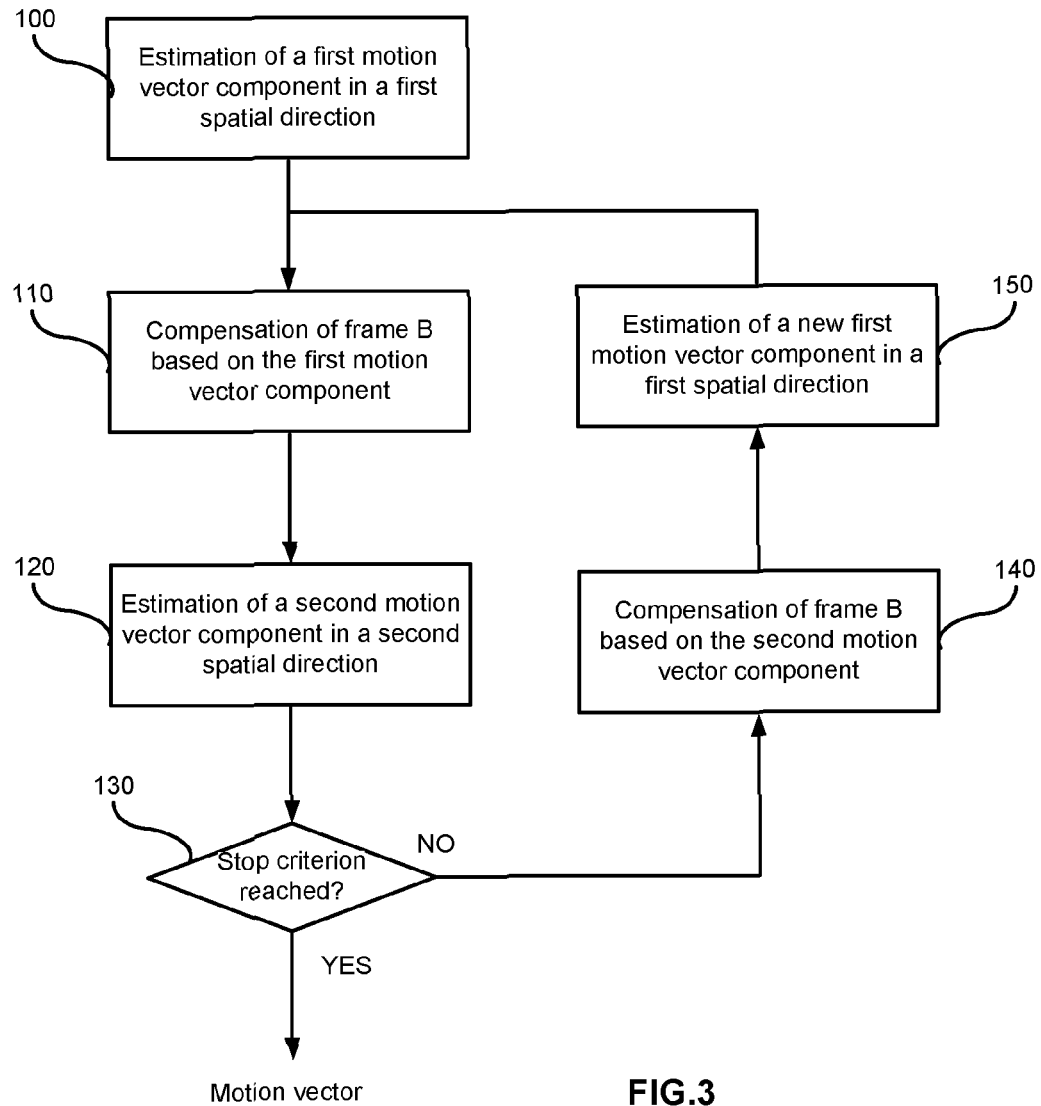
FIG. 3 shows the steps of a second embodiment of the inventive method.

FIG. 3 illustrates a second method of estimating the motion at a predefined time position in a video sequence comprising the frames A and B. This method comprises a greater number of estimation steps. This method comprises the steps 100 to 120 as described in reference to FIG. 1 and additional steps.

The additional steps are:
a step 130 for checking if a first stop criterion is reached; and
as long as the first stop criterion is not reached, a step 140 of compensating at least a part of the second video frame B based on at least a part of the second motion vector component estimated at step 120 and a step 150 of estimating, for the at least one pixel of a frame located at the predefined time position, a new first motion vector component in the first spatial direction based on the video frame a and the new compensated video frame B and reiterating the steps 110 to 130.

The first stop criterion is for example reached when the number of iterations is equal to N, N being an integer greater than one. N is for example equal to 2 or 3. This first stop criterion can also be a convergence criterion. For example, if the difference between the first and second motion vector components of two successive iterations is lower than a threshold (for example, if the difference is close to zero), the first stop criteria is reached. At step 140, instead of compensating the video frame B in accordance with the motion vector component estimated at step 120, it is also possible to compensate the video frame A in accordance with a part of the motion vector component estimated at step 120 and to compensate the video frame B in accordance with another part of the motion vector component estimated at step 120. In this second case, the estimation step 150 is carried out between the two compensated video frames.

Figure 4A:
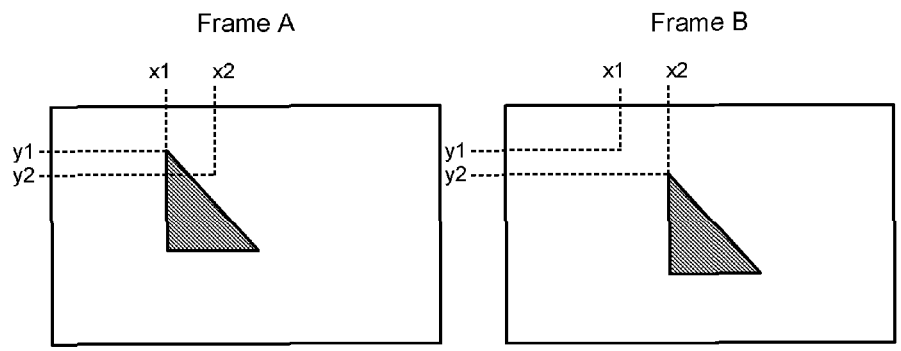
FIG. 4A to FIG. 4N shows an example of motion estimation in accordance with the method of FIG. 3.
Figure 4B:
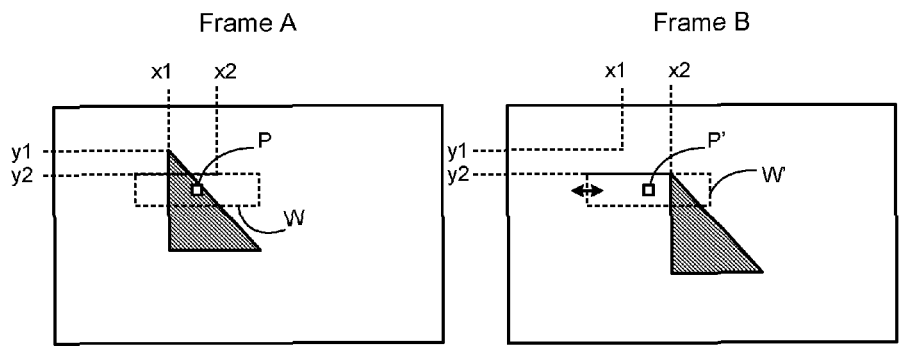
Figure 4C:
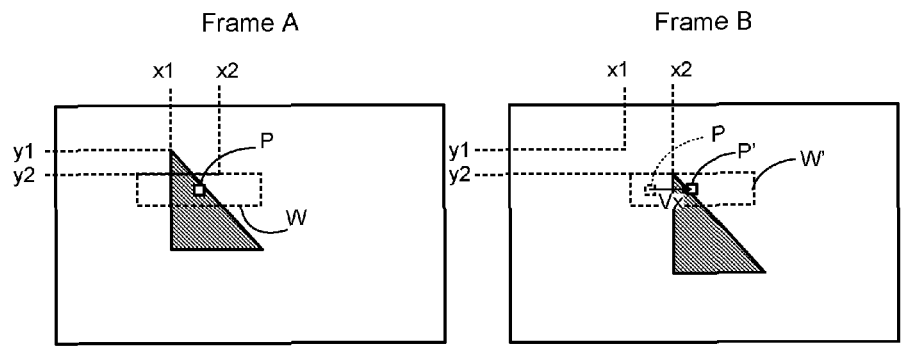
Figure 4D:
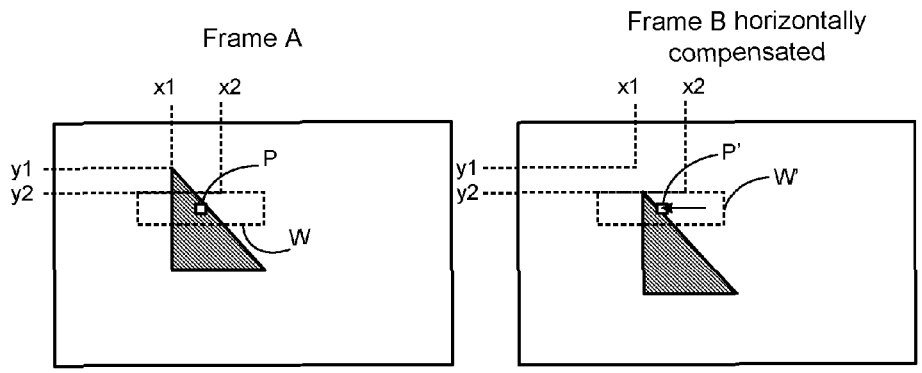
Figure 4E:
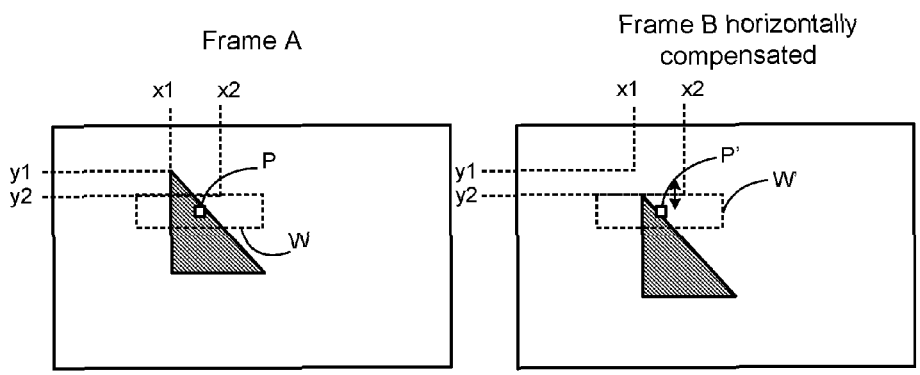
Figure 4F:
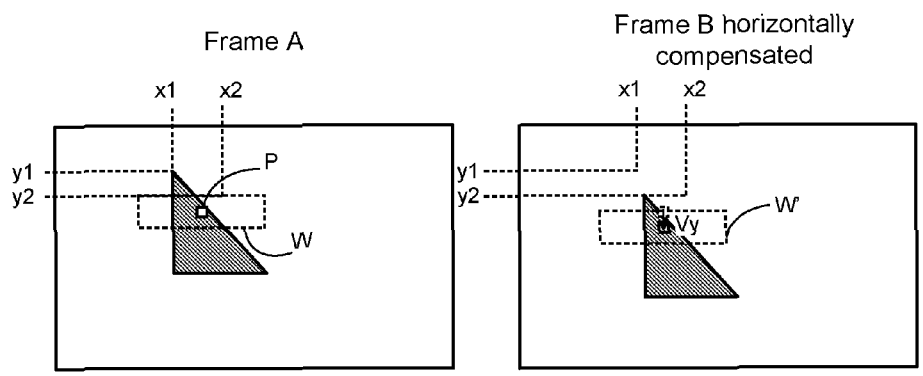
Figure 4G:
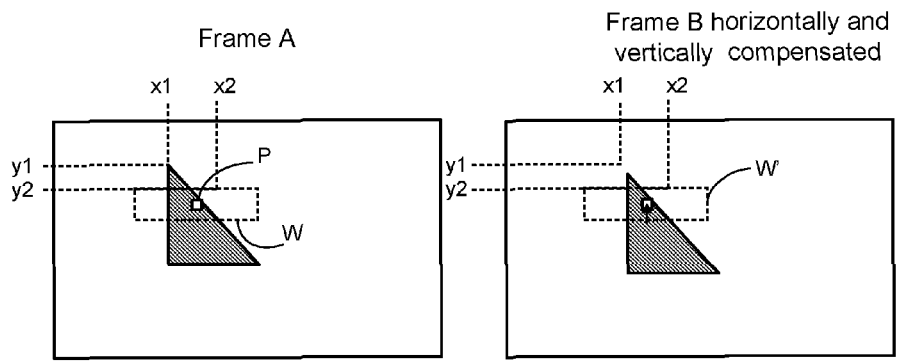
Figure 4H:
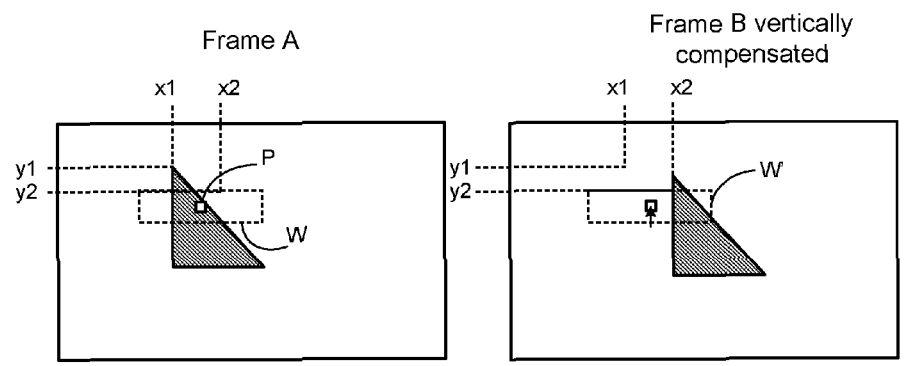
Figure 4I:
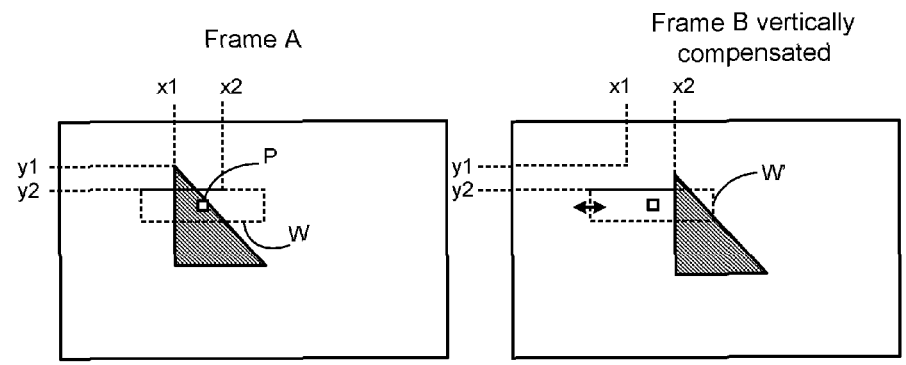
Figure 4J:
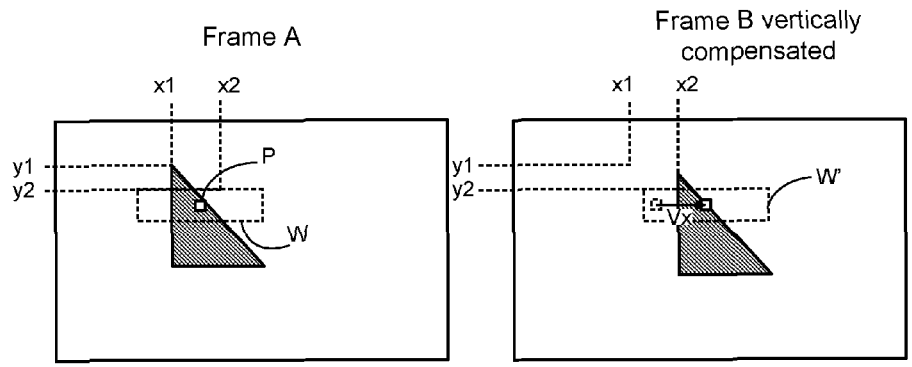
Figure 4K:
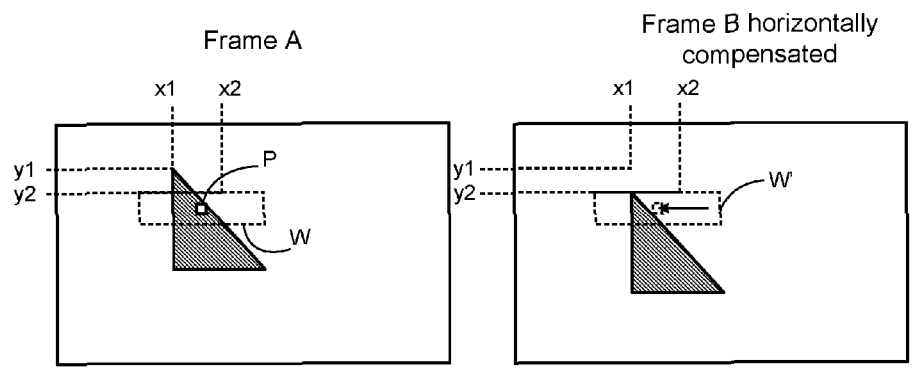
Figure 4L:
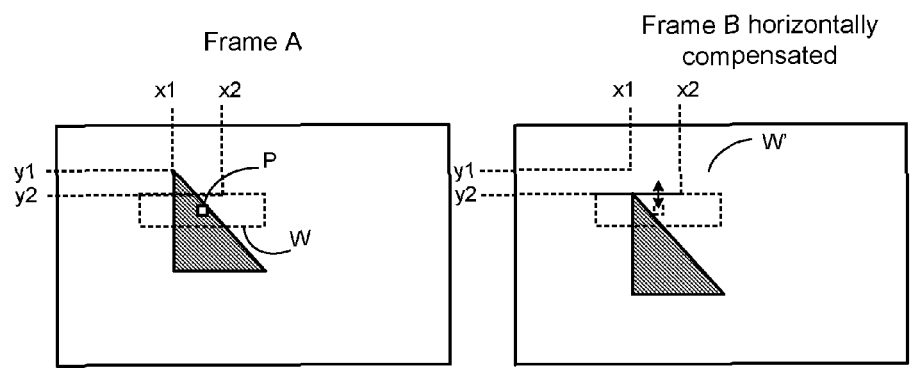
Figure 4M:
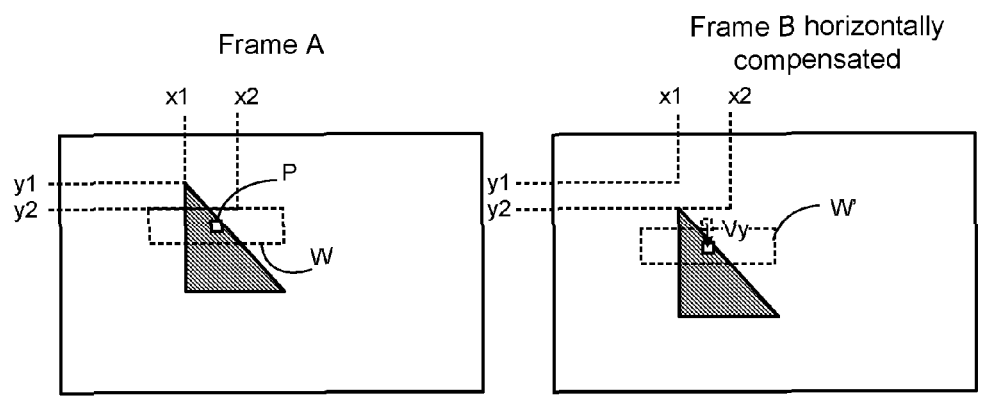
Figure 4N:
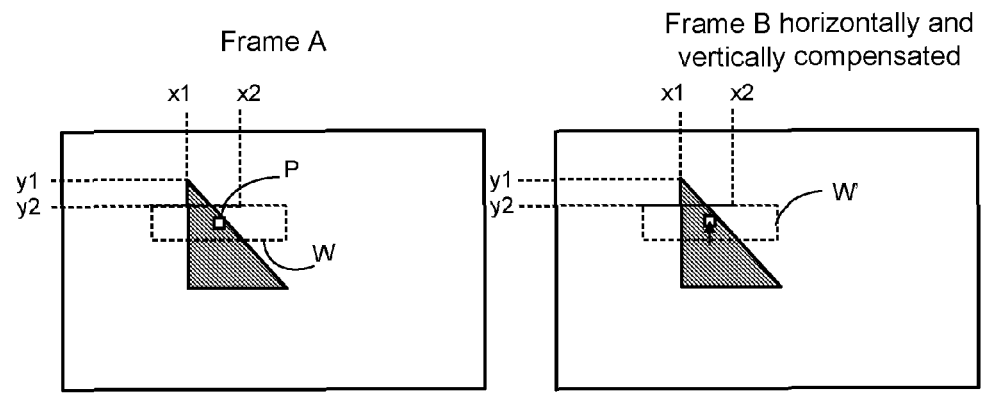

This second method is illustrated by an example given at FIGS. 4A to 4N. In this example, the first spatial direction is the horizontal direction and the second spatial direction is the vertical direction. The motion vector is estimated for a pixel P of the frame A (the predefined time position corresponds to the time position of the video frame A). The video frame A is a picture showing a grey triangle 20 on a white background. The horizontal and vertical coordinates of the left-upper corner of the triangle are x1 and y1. In the video frame B, the grey square has moved and the horizontal and vertical coordinates of the left-upper corner of the triangle in this frame are x2 and y2.

The FIG. 4A shows the frames A and B. In FIG. 4B, a window W centered on a pixel P is defined in frame A. A window W' identical to the window W is defined in frame B. This window W' is centered on a pixel P' having the same spatial coordinates than the pixel P. The estimating step 100 consists in shifting horizontally the window W' in order to determine the best match between the content of the window W and the content of the window W'. In case of a time position of the motion estimation not located on frame A or B, the windows W and W' would be shifted together with their corresponding center pixel P and P' along the motion vector positioned on the pixel in the frame at the predetermined time position. FIG. 4C shows the best match and the estimated horizontal component Vx of the motion vector. The step 110 is illustrated by the FIG. 4D. The frame B is compensated according to the motion vector component Vx. The estimating step 120 consists in shifting vertically the window W' in order to determine the best match between the content of the window W and the content of the window W' as illustrated by the FIG. 4E. FIG. 4F shows the best match and the estimated vertical component Vy of the motion vector. FIG. 4G shows the frame B compensated horizontally and vertically in accordance with the motion vectors Vx and Vy estimated previously. This FIG. 4G does not correspond to a step of the method but it is provided to show that the estimation is not correct at this stage of the process. Some additional steps have to be carried out to improve this estimation. These additional steps are carried out as long as the stop criteria at step 130 is not reached. This stop criteria is for example a number of iterations of the steps 110 and 120. To be sure to have a correct estimation, this number of iterations is for example equal to 2 or more. Then the steps 140 and 150 are thus carried out. FIG. 4H shows the frame B compensated vertically in accordance with the motion vector Vy. The estimating step 150 consists in shifting horizontally the window W' as illustrated by FIG. 4I in order to determine the best match between the content of the window W and the content of the window W'. FIG. 4J shows the best match and the new estimated horizontal component Vx of the motion vector. The step 110 following the step 150 is illustrated by the FIG. 4K. The frame B is compensated according to the new motion vector component Vx. The following estimating step 120 consists in shifting vertically the window W' as illustrated by FIG. 4L in order to determine the best match between the content of the window W and the content of the window W'. FIG. 4M shows the best match and the new estimated vertical component Vy of the motion vector. The final vectors (Vx,Vy) is the motion vector estimated for the pixel P. The FIG. 4N shows the frame B compensated horizontally and vertically in accordance with the final motion vectors Vx and Vy estimated previously. This FIG. 4N does not correspond to a step of the method but shows that the estimation is correct.

Figure 5:
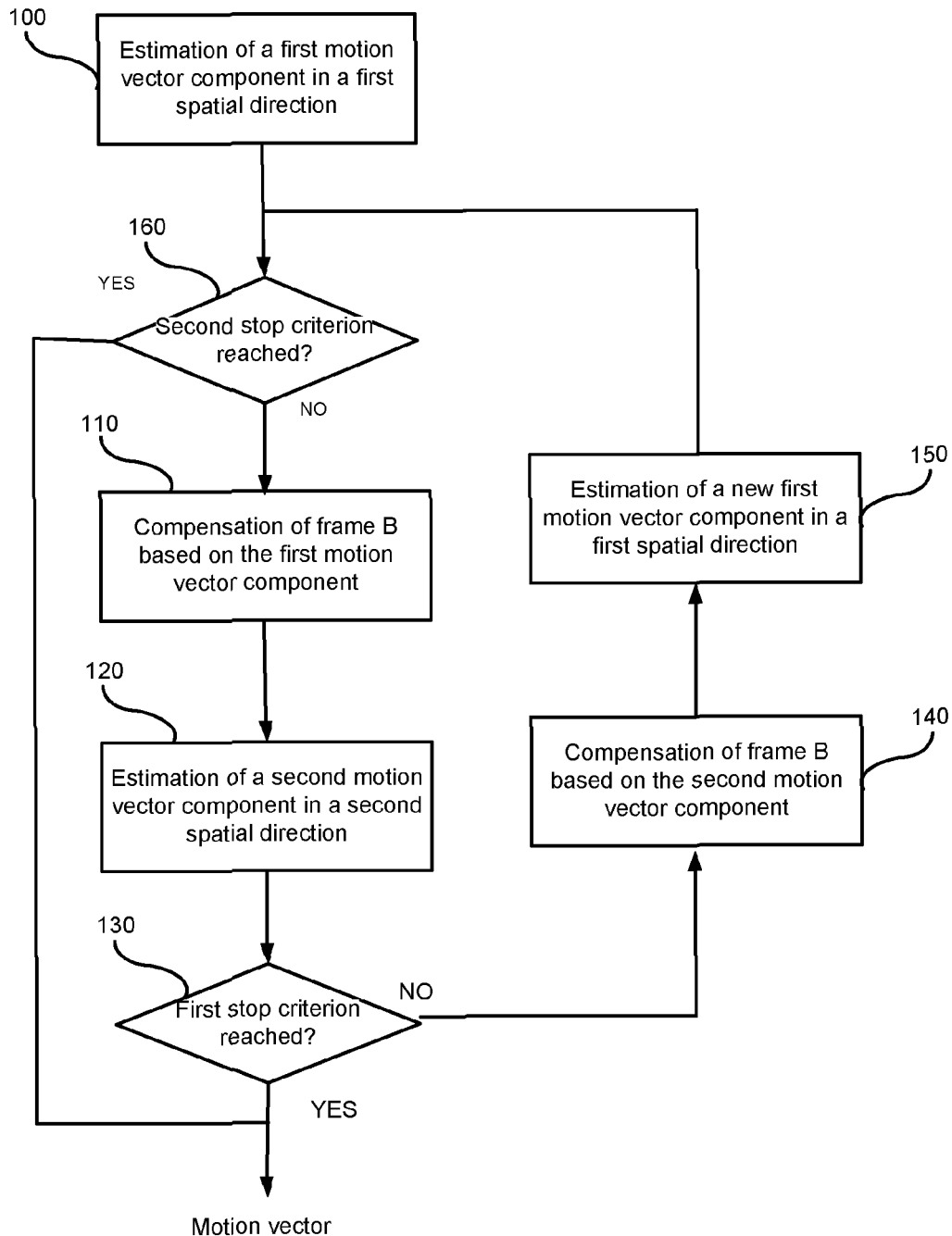
FIG. 5 shows the steps of a third embodiment of the inventive method.

FIG. 5 illustrates a third method of estimating motion between a video frame A and a video frame B. This method comprises the steps 100 to 150 as described in reference to FIG. 3 and a step 160 for checking if a second stop criterion is reached after the step 150. The steps 110 to 130 are reiterated only if a second stop criterion is not reached. This second stop criterion is for example not reached when the difference between two consecutive new first motion vector components resulting from two consecutive iterations of step d) is greater than a threshold value. For example, if the difference is lower than 1 pixel per frame, the second stop criterion is reached and the motion vector estimated for the current pixel is defined by the last estimated first and second motion vector components.

Figure 6:
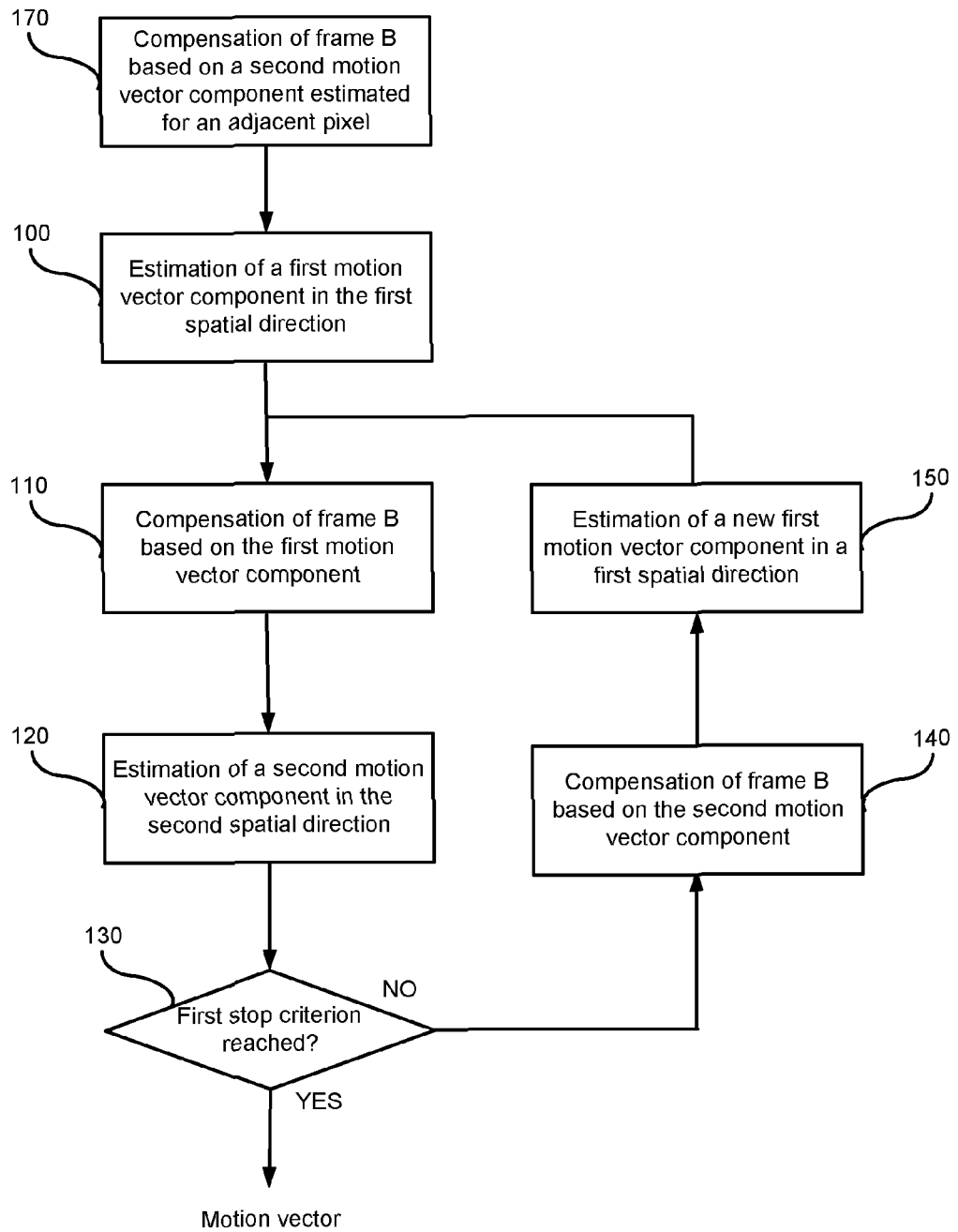
FIG. 6 shows the steps of a fourth embodiment of the inventive method.

FIG. 6 illustrates a fourth method of estimating motion between a video frame A and a video frame B. In this method, it is proposed, in order to estimate the first motion vector component of a given pixel, to use the second motion vector component estimated for an adjacent pixel (belonging to the previous line for example). This method comprises the steps 100 to 150 as described in reference to FIG. 3 and a step 170 of compensating the first video frame B based on a second motion vector component estimated for an adjacent pixel. This compensating step is carried out before the step 100. If the first stop criterion is a convergence criterion, this new step 170 will allow to increase the accuracy of the motion vectors and so to reach more quickly the convergence criterion.

Figure 7:
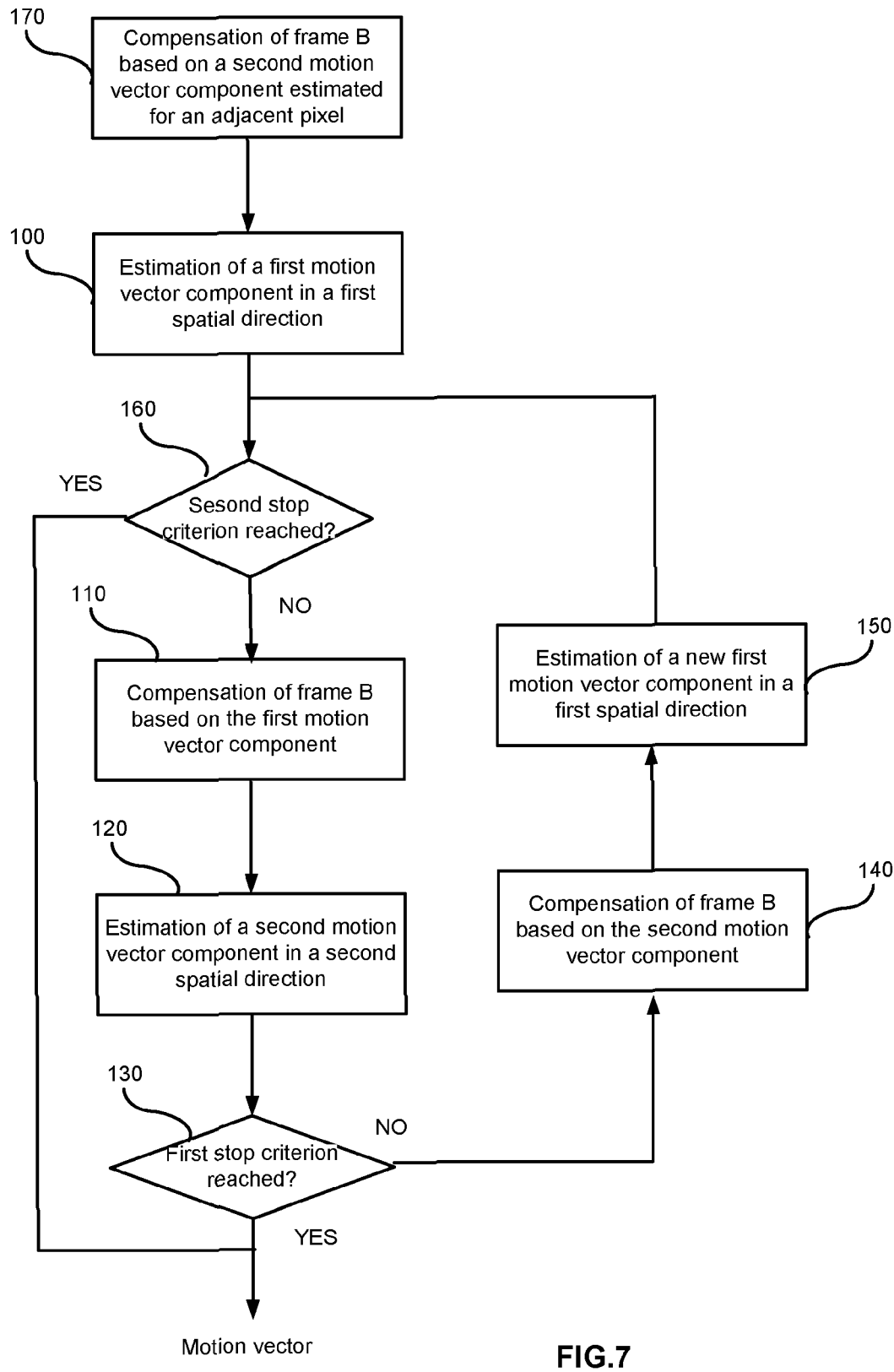
FIG. 7 shows the steps of a fifth embodiment of the inventive method.

FIG. 7 illustrates a fifth method of estimating motion between a video frame A and a video frame B. In this method, it is also proposed, in order to estimate the first motion vector component of a given pixel, to use the second motion vector component estimated for an adjacent pixel This method comprises the steps 100 to 160 as described in reference to FIG. 5 and a step 170 of compensating the first video frame B based on a second motion vector component estimated for an adjacent pixel belonging to a previous or next line. This compensating step is carried out before the step 100. If at least one of the first and second stop criteria is a convergence criterion, this new step 170 will allow to reach more quickly the convergence criterion since this increases the accuracy of the motion vectors.

Figure 8:
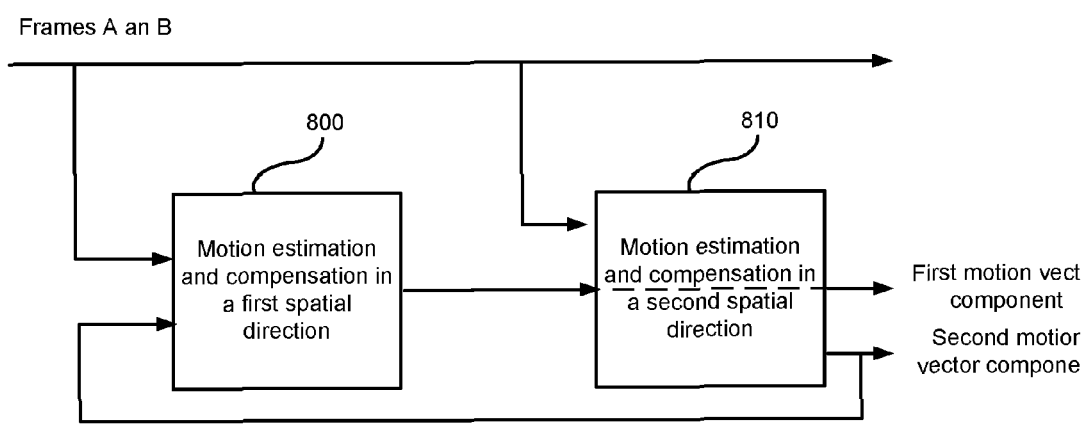
FIG. 8 shows a device for implementing the inventive method.

FIG. 8 shows a device for implementing the methods illustrated by FIGS. 1 to 6. Since the estimation steps are each made on only one spatial direction, the device comprises two blocks 800: a block 800 for the motion estimation and compensation in the first spatial direction and a block 810 for the motion estimation and compensation in the second spatial direction. The steps 100, 110 and, if need be, the steps 150 and 160 are carried out by the block 800 and the steps 120, 130 and, if need be, the steps 140 and 160 are carried out by the block 810. Additional line memories are needed to carry out the step 170.

The invention is not restricted to the disclosed embodiments. Various modifications are possible and are considered to fall within the scope of the claims.

The steps 100, 110 and 120 (same for 140, 150 and 170) could be done on a part of the video frames or on the whole frames one step after the other. In the first case, it means a motion estimation in a first spatial direction for a part of the frame, then a compensation of a part of frame A and/or B in this first spatial direction, and then finally an estimation in the second spatial direction. In the second case, it means a motion estimation in a first spatial direction for the whole frame, then a compensation of the whole frame A and/or B in this first spatial direction, and then finally an estimation in the second spatial direction.

Many variations are also possible regarding the compensation (and the use of the vectors).

For estimating the motion of a single pixel, the whole video frame is not required; in fact just the pixels used for the motion estimation are needed, so that just this part of the video really needs to be compensated. (It is also possible to compensate the whole frame(s) as described before)

It is of course possible to compensate the needed video area using the corresponding vectors of each pixel, but to save some resources and line memories it is possible to use the same vector information for several pixels. For example for the horizontal compensation (before the vertical estimation), the video can be compensated by columns, each column being shifted using the vector of the central pixel of the column.

The invention claimed is:

1. Method of estimating motion at a predefined time position in a video sequence comprising at least first and second video frames, comprising the steps of:
   a) estimating, for at least one pixel of a frame located at the predefined time position, a first motion vector component in a first spatial direction based on the first video frame and the second video frame,
   b) compensating at least a part of the second video frame based on at least a part of the estimated first motion vector component,
   c) estimating, for the at least one pixel of a frame located at the predefined time position, a second motion vector component in a second spatial direction based on the first video frame and the compensated second video frame to use the estimation in the second direction to compensate at least the first or the second video frame in the second direction before estimating the motion in the first direction to improve the estimations in both directions with said recursive estimation; and
   d) checking if a first stop criterion is reached at the end of the step c).

2. Method according to claim 1, further comprising the step of:
  e) as long as a first stop criterion is not reached, compensating the second video frame based on at least a part of the estimated second motion vector component, estimating for the at least one pixel of a frame located at the predefined time position a new first motion vector component in the first spatial direction based on the first video frame and the new compensated second video frame and reiterating the steps b) to d).

3. Method according to claim 1, wherein the first spatial direction is the horizontal direction and second spatial direction is the vertical direction.

4. Method according to claim 1, wherein the first spatial direction is the vertical direction and second spatial direction is the horizontal direction.

5. Method according to claim 1, wherein the second video frame is consecutive to the first video frame.

6. Method according to claim 1, wherein the first video frame is consecutive to the second video frame.

7. Method according to claim 2, wherein the first stop criterion is not reached as long as the number of iterations is not equal to N, N being an integer greater than one.

8. Method according to claim 2, wherein the first stop criterion is not reached as long as the differences between the first and second motion vector components resulting from a first iteration in step e) and the first and second motion vector components resulting from a next iteration in step e) are greater than a threshold value.

9. Method according to claim 2, wherein, in step e), the steps b) to d) are reiterated only if a second stop criterion is not reached.

10. Method according to claim 9, wherein the second stop criterion is not reached as long as the difference between a new first motion vector component resulting from a first iteration in step e) and a new first motion vector components resulting from a next iteration in step e) is greater than a threshold value.

* * * * *